United States Patent [19]
McCorsley, III et al.

[11] Patent Number: 5,960,595
[45] Date of Patent: Oct. 5, 1999

[54] LAMINATE COMPRISING MATTING LAYER AND ROOF CONSTRUCTION CONTAINING THE SAME

[75] Inventors: Clarence C. McCorsley, III, Asheville, N.C.; Kenneth L. Laubsch, Chalfont, Pa.

[73] Assignees: Akzo Nobel nv, Arnhem, Netherlands; Benjamin Obdyke Incorporated, Warminster, Pa.

[21] Appl. No.: 08/852,650

[22] Filed: May 7, 1997

[51] Int. Cl.$^6$ ...................................................... E04B 7/00
[52] U.S. Cl. ........................... 52/199; 52/302.1; 156/210; 454/365
[58] Field of Search ........................... 52/199, 57, 302.1; 454/365, 364; 156/167, 210, 202, 471–473

[56] References Cited

U.S. PATENT DOCUMENTS

| | | | |
|---|---|---|---|
| 3,687,759 | 8/1972 | Werner et al. | 156/167 |
| 3,691,004 | 9/1972 | Werner et al. | 161/150 |
| 4,212,692 | 7/1980 | Rasen et al. | 156/167 |
| 4,252,590 | 2/1981 | Rasen et al. | 156/167 |
| 4,315,392 | 2/1982 | Sylvest | 52/309.1 |
| 4,325,290 | 4/1982 | Wolfert | 98/42 A |
| 4,538,388 | 9/1985 | Friesen | 52/199 |
| 4,942,699 | 7/1990 | Spinelli . | |
| 5,099,627 | 3/1992 | Coulton et al. | 52/408 |
| 5,122,095 | 6/1992 | Wolfert | 454/365 |
| 5,167,579 | 12/1992 | Rotter | 454/365 |
| 5,352,154 | 10/1994 | Rotter et al. | 454/365 |
| 5,425,672 | 6/1995 | Rotter | 454/365 |
| 5,561,953 | 10/1996 | Rotter | 52/198 |
| 5,651,734 | 7/1997 | Morris | 454/365 |
| 5,673,521 | 10/1997 | Coulton | 52/199 |

*Primary Examiner*—Creighton Smith
*Attorney, Agent, or Firm*—Richard P. Fennelly

[57] ABSTRACT

The present invention relates to a laminate, adapted to be used as in a roof ridge vent construction, which comprises (a) a matting layer comprising randomly convoluted polymeric filaments, a portion of the matting layer comprising a plurality of truncated pyramidal cusps, with at least one outwardly extending edge portion of the matting layer which is planar with one surface of the matting layer; and (b) a fabric backing bonded to the matting layer and extending outwardly and being bonded to the outwardly extending, planar edge portion of that matting layer.

19 Claims, 3 Drawing Sheets

LAMINATE COMPRISING MATTING LAYER AND ROOF CONSTRUCTION CONTAINING THE SAME

BACKGROUND OF THE INVENTION

It is known in the art to ventilate the roof ridge area using a variety of products. As is well known in the art, such vent products allow for air trapped in the attic of a building to be vented through the crest of the roof (with replacement air being allowed to enter, e.g., via vents in the soffit area). Included among the known products are several which utilize a porous material to insure that ventilation takes place without the ingress of unwanted elements, such as moisture, debris, insects, and the like. Examples of prior art disclosures that are generally germane to the present invention include the following:

U.S. Pat. No. 4,325,290 to C. K. Wolfert shows an early disclosure of the use of a non-cuspated nonwoven mat as the filter in a vent cap system.

U.S. Pat. No. 4,942,699 to L. J. Spinelli shows a vent construction comprising a non-cuspated matting of randomly convoluted polymeric filaments that are heat bonded to a porous sheet material layer. The subject matter shown in this patent has been sold by the assignee, Benjamin Obdyke Inc., under the trademark ROLL VENT for several years. More recently, the aforesaid Benjamin Obdyke Inc. has been selling a cuspated, more rigid product under the trademark ROLL VENT 2.

U.S. Pat. No. 5,122,095 to C. K. Wolfert illustrates an adjustable filtered roof ridge ventilator comprising a filter medium.

Another roof venting system is described in U.S. Pat. No. 5,167,579 to M. J. Rotter which employs a non-cuspated, unitary mat of randomly aligned synthetic fibers which are opened and blended, randomly aligned by airflow, and joined by phenolic or latex binding agents and heat cured to produce an air permeable varying mesh.

U.S. Pat. No. 5,425,672 to M. J. Rotter shows a roof vent of synthetic fiber matting which contains a grid of solid cores to insure the needed compression resilience of the construction.

SUMMARY OF THE INVENTION

The present invention, in one embodiment, is a laminate, adapted to be used as in a roof ridge vent construction, which comprises (a) a matting layer comprising randomly convoluted polymeric filaments, a portion of the matting layer comprising a plurality of truncated pyramidal cusps, with at least one outwardly extending edge portion of the matting layer which is planar with one surface of the matting layer; and (b) a fabric backing bonded to the matting layer and extending outwardly and being bonded to the outwardly extending, planar edge portion of that matting layer. In another embodiment, the invention pertains to the roof construction which contains the aforementioned laminate in a roof ridge vent construction.

DESCRIPTION OF THE DRAWINGS

The present invention is further illustrated by reference to the Drawings which form a portion of the present Specification wherein.

DESCRIPTION OF THE PREFERRED EMBODIMENTS

Figure 1:
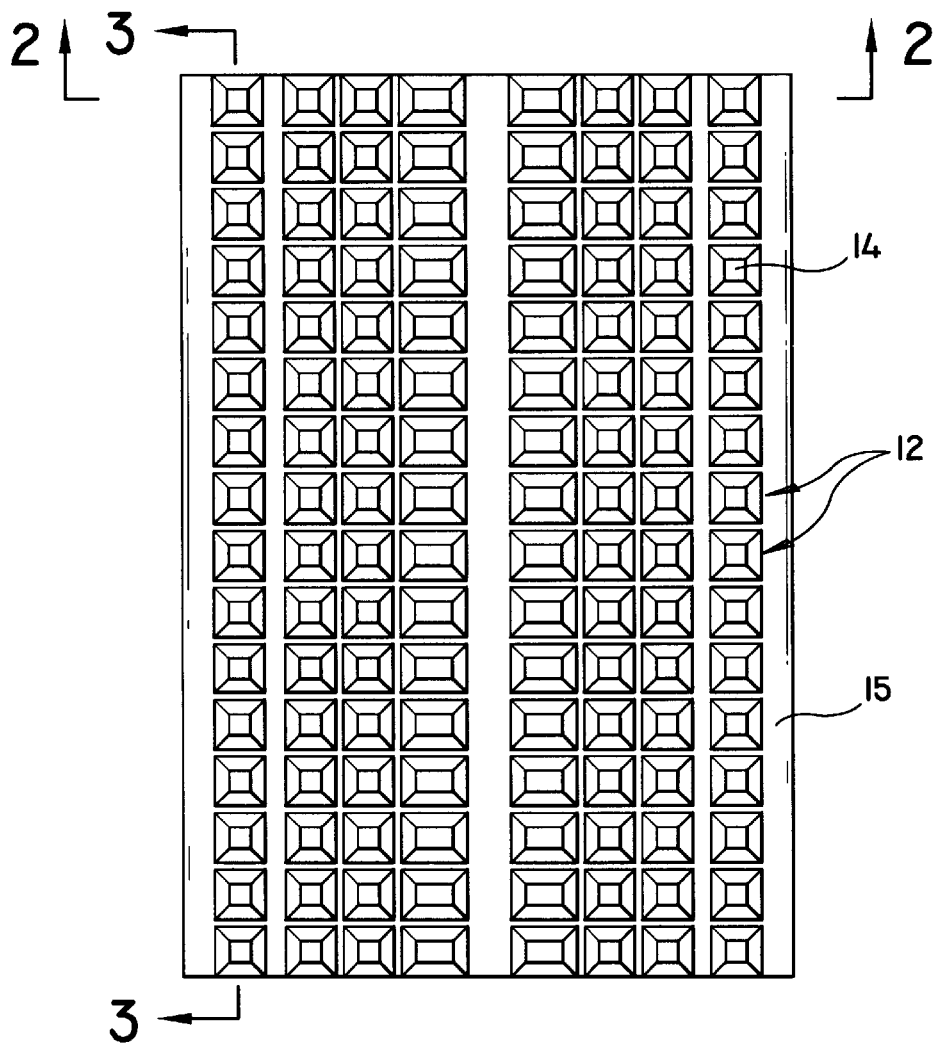
FIG. 1 is an overhead view of the laminate of the present invention showing the arrangement of the downwardly facing, truncated pyramidal cusps formed in the matting layer.
Figure 1A:
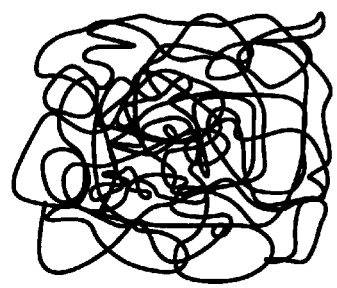
FIG. 1A is a view, in more detail than provided in FIG. 1, showing the construction of the matting layer used in the laminate of the present invention.

FIG. 1 is an overhead view of the matting layer 11 of the laminate of the present invention which comprises randomly convoluted polymeric filaments. This matting layer can, for example be made in accordance with the method described in U.S. Pat. No. 4,252,590 to A. Rasen, which is incorporated herein by reference, using a profile 4 which is the negative image of the profile 5 with square truncated upper surface 6 as depicted in FIG. 3 of the Rasen et al. patent.

Figure 2:
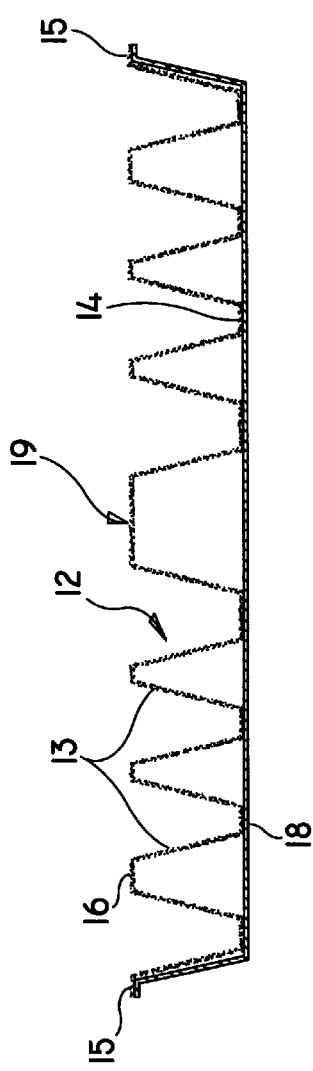
FIG. 2 is a cross-sectional view taken in the direction of the arrows joined to line 2—2' in FIG. 1.
Figure 3:
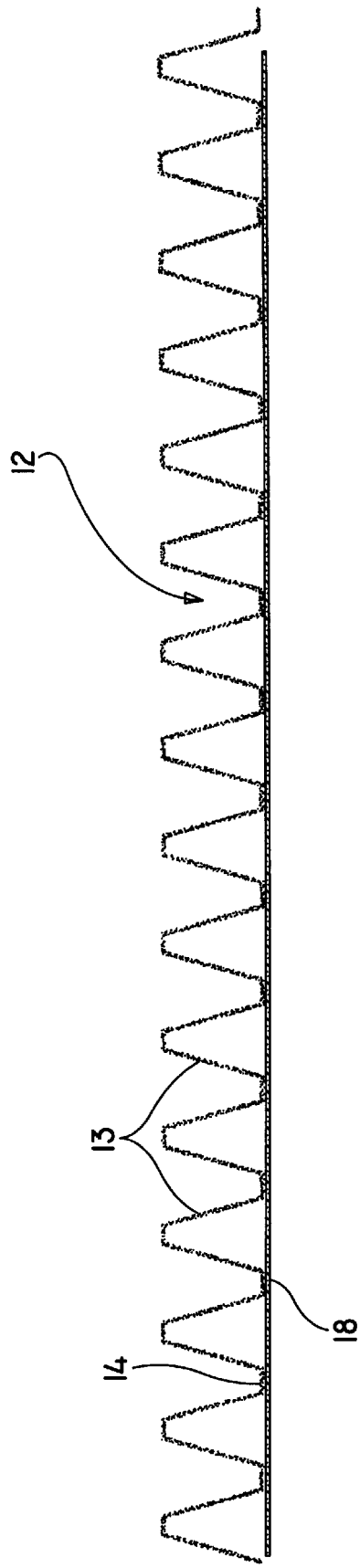
FIG. 3 is a cross-sectional view taken in the direction of the arrows joined to line 3—3' in FIG. 1.

The matting 11 has formed in its body a plurality of truncated pyramidal cusps 12 which have sloping sides 13, as best seen in FIGS. 2 and 3, and a generally flat floor, or apex, 14 at the point of truncation. These cusps can be readily formed by extruding the plastic filaments, while they are still capable of deformation, onto the previously described negative image of the profile shown in FIG. 3 of the Rasen et al. patent. The matting layer 11 of the laminate of the present invention also has at least one outwardly extending edge marginal portion 15 which is coplanar with the upper surface 16 of the matting layer 17 thereby forming bases for the cusps 12 and a coplanar wing 15, or flange, portion for the matting layer 11 (as best seen in FIG. 2). Preferably, a pair of flanges 15 extend lengthwise of the layer 11. The laminate also comprises a fabric backing 18 bonded to the opposed bottom of the truncated pyramidal cusps and, thus, the matting layer itself. This fabric precludes the entry of insects, debris, and other unwanted elements when the laminate is used as a roof ridge vent construction. This fabric backing extends outwardly towards the "wing" portions 15 of the matting layer 11 and is bonded (preferably, heat bonded) to those outwardly extending, planar edge portions of the matting layer.

In a preferred embodiment, the matting layer 11 previously described is constructed from a series of nylon 6 macrofilaments which have a diameter of from about 200 to about 1000 microns, preferably about 550 microns. These filaments form a planar mesh construction that takes the shape of the cusp structure, upon formation, as described above, wherein the cusps have a height of from about 0.25 inch to about 2 inches, preferably about 1 inch. The weight of the matting layer 11 can range about 30 to about 100 grams per square foot, preferably from about 50 to about 60 grams per square foot, with the preferred width of the laminate ranging from about 6 inches to about 15 inches, depending upon the roof shingle structure, but preferably will have a width of from about 10 to about 11 inches.

A suitable fabric 18 to use in the present laminate is available under the trademark COLBACK from Akzo Nobel Nonwovens Inc. and is preferably a bi-component yarn of polyester and nylon. A most preferred fabric has the following specifications: weight—about 100 grams per square meter; thickness—about 0.5 mm; tenacity—about 44 pounds per inch; elongation—about 34%; and apparent opening size (AOS)—about 40.

Figure 4:
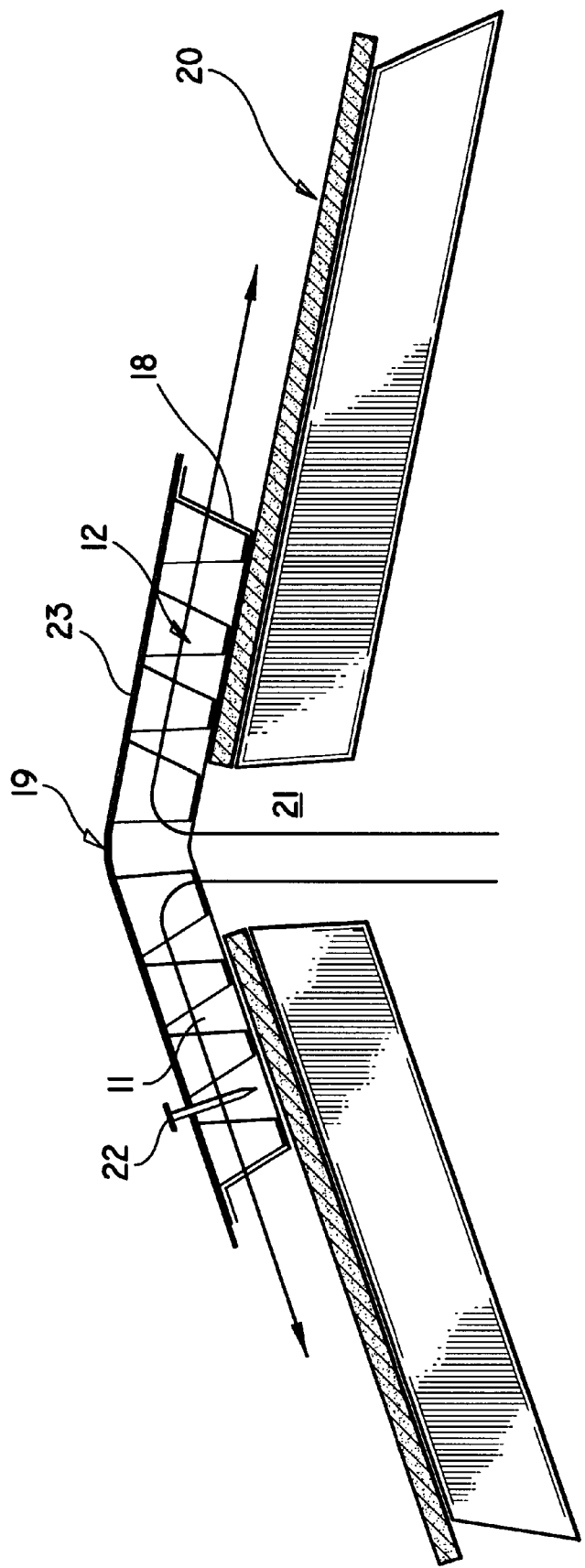
FIG. 4 is a side cross-sectional view showing the laminate of the present invention in a roof vent construction.

In a preferred embodiment, the matting layer has a hinge portion 19 which can be flexed to conform the product to the roof ridge of a roof as shown in FIG. 4. The laminate described herein can be appropriately fastened to a roof deck and shingle portion 20 of the roof, over the ridge vent 21, using nails 22 (which will, of course, be hidden from view by the overlapping shingles 23 once they are installed) to allow for appropriate air flow (as shown by the arrows in FIG. 4) through the vent and through the matting layer 11 of the laminate so that the needed ventilation of the building's attic or uppermost floor takes place. The cap shingles 23 are conventionally installed over the laminate with the "wing" portion of the laminate providing support.

The laminate of the present has a number of advantages over previous laminate constructions known to persons of ordinary skill in the art. The novel pyramidal structures of the matting layer, which make this product a "cuspated" rather than "non-cuspated" product, assist in affording the desired degree of noncompressibility to the product during such operations as the nailing of the structure to a roof of a building. The cuspated pyramidal structures do not impede the free flow of air through the present laminate since they are highly porous thereby distinguishing the present structure from the cuspated product sold under the trademark ROLL VENT 2. Since the fabric backing is supported on the exterior of the "cusps", it does not intrude into the inner structure of the present laminate so as to restrict the desired air flow through the laminate construction. In addition, having the smaller end of the novel pyramidal structures in contact with and directly attached to the backing material affords a surprising degree of desired stiffness as compared to not having such a portion of that structure attached to that backing. The fabric backing in the present laminate, due to the presence of the outwardly extending, planar edge portion of that matting layer (a "wing" portion thereof) is more protected from direct sunlight when the normal cap shingle is installed over the laminate in the completed roof ridge vent. The fabric backing either may or may not be bonded to the surface of the outermost cusp at 18 in FIG. 4 and either may or may not lap over the top edge of the "wing" structure. Also, the laminate of the present invention provides a support for the edge of the normal shingle used in the roof ridge vent construction by means of the "wing" thereby precluding drooping of the shingle during extreme conditions of heat which would tend to cut off part of the desired air flow through the construction. The hinge area formed in the laminate of the present invention allows for flexing of the laminate construction so that it can be bent over the ridge of the roof without damage to the construction. The preferred thermal bonding to the matting layer to the backing material avoids the presence of glue which, in extreme heat conditions, could undesirably liquefy compromising the bond between the matting layer and the backing. However, if desired, the bonding could be achieved by using glue or by using ultrasonic bonding, which some persons in the art consider as a form of thermal bonding. The fabric backing, in a preferred embodiment, not only covers the exposed areas on each end of the vent (end cap), but also covers the slot area of the roof, thereby preventing intrusion of undesired insects, debris, and other items into the structure from within the attic. The laminate of the present invention can be easily rolled and can be easily adjusted or aligned once installation of the laminate in a roof construction has begun.

The foregoing is provided for purposes of illustration only and should not, for that reason, be used to construe the present invention in a limiting sense. The scope of protection sought is set forth in the claims which follow.

We claim:

1. A laminate which comprises (a) a matting layer of randomly convoluted polymeric filaments, a portion of the matting layer comprising a plurality of truncated pyramidal cusps, with at least one outwardly extending edge portion of the matting layer which is planar with one surface of the matting layer; and (b) a fabric backing bonded to the matting layer and extending outwardly and being bonded to the outwardly extending, planar edge portion of that matting layer.

2. A laminate as claimed in claim 1 wherein the fabric backing (b) is in contact with the truncated portion of the pyramidal cusps.

3. A laminate as claimed in claim 1 wherein two opposed edge portions of the matting layer are outwardly extending and planar.

4. A laminate as claimed in claim 1 wherein two opposed edge portions of the matting layer are planar and the fabric backing (b) is in contact with the truncated portion of the pyramidal cusps.

5. A laminate as claimed in claim 1 wherein two opposed edge portions of the matting layer are planar, the fabric backing (b) is in contact with the truncated portion of the pyramidal cusps, and two opposed edge portions of the matting layer are outwardly extending and planar.

6. In combination, the laminate of claim 1 and the roof ridge vent area of a building.

7. In combination, the laminate of claim 2 and the roof ridge vent area of a building.

8. In combination, the laminate of claim 3 and the roof ridge vent area of a building.

9. In combination, the laminate of claim 4 and the roof ridge vent area of a building.

10. In combination, the laminate of claim 5 and the roof ridge vent area of a building.

11. A roof vent for a roof ridge having an elongate slot, comprising: a continuous, indeterminate length, roll-form layer of randomly convoluted polymeric filaments; said layer having a planar portion and a plurality of lengthwise spaced apart cusps projecting from said planar portion; said cusps each having a base portion coplanar with said layer and an apex portion; and a fabric backing laminated across the apex portions of said cusps for confronting the slot when said roof vent is installed.

12. The roof vent according to claim 11 wherein said fabric backing is bonded to preselected ones of said cusps at their apexes.

13. The roof vent according to claim 11 wherein said cusps are of truncated shape having smaller apexes than bases.

14. A roof vent for filtering air through an opening communicating between the interior and exterior of a building, said roof vent comprising: a layer of randomly convoluted polymeric filaments formed to extend over the opening, said layer having a pair of oppositely extending coplanar edge margin flanges and defining a planar portion and a plurality of spaced apart cusps projecting from said planar portion, each of said cusps having a base portion coplanar with said layer and an apex portion; and a fabric backing laminated across paid apex portions and being bonded to said coplanar edge margin flanges for overlying the opening when said roof vent is installed.

15. The roof vent according to claim 14 wherein said backing is laminated to at least preselected ones of said apex portions.

16. The roof vent according to claim 14 wherein said cusps are of truncated shapes having smaller apexes than bases.

17. A roof vent, comprising: a continuous, indeterminate length, roll-form layer of randomly convoluted polymeric filaments; said layer having a planar portion, a pair of lengthwise extending coplanar edged margin flanges, and a plurality of lengthwise spaced apart cusps projecting from said planar portion; said cusps each having a base portion coplanar with said layer and an apex portion; and a fabric backing laminated across the apex portions of said cusps and being bonded to said coplanar edge margin flanges.

18. A roof vent, comprising: a continuous, indeterminate length, roll-form layer of randomly convoluted polymeric filaments; said layer having a planar portion and a plurality of lengthwise spaced apart cusps projecting from said planar portion; said cusps each having a base portion coplanar with said layer and an apex portion; a fabric backing laminated across the apex portions of said cusps; and a roof ridge defining an elongate vent slot confronting said fabric backing when said roof vent is installed.

19. A roof vent for filtering air through an opening communicating between the interior and exterior of a building, said roof vent comprising: a continuous, indeterminate length, roll-form layer of randomly convoluted polymeric filaments formed to extend over the opening, said layer defining a planar portion and a plurality of spaced apart cusps projecting from said planar portion, each of said cusps having a base portion coplanar with said layer and an apex portion; and a fabric backing laminated across said apex portions for overlying the opening when said roof vent is installed.

* * * * *